(No Model.)
F. LEHNER.
PROCESS OF MAKING ARTIFICIAL SILK.
No. 559,392. Patented May 5, 1896.
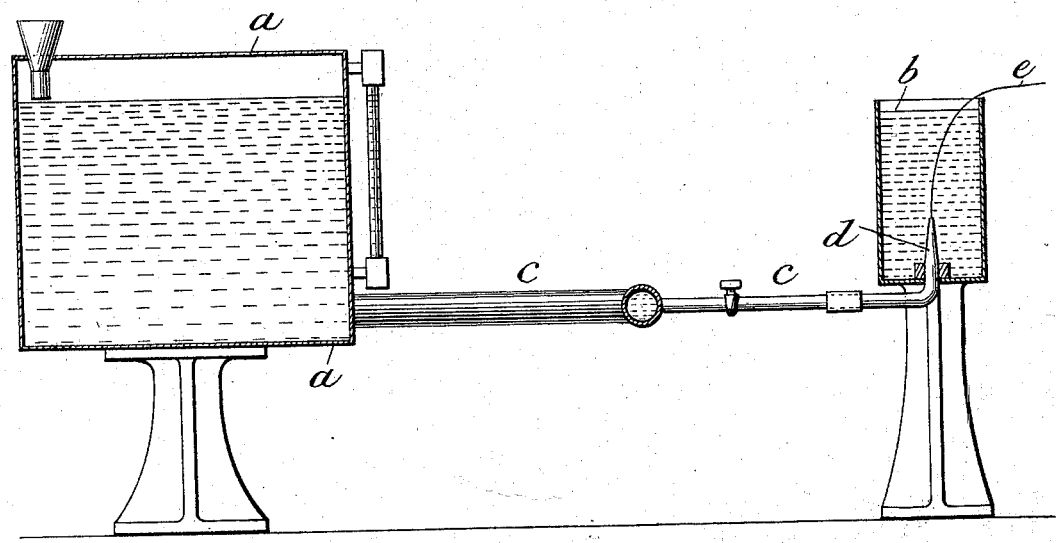
Attest:
F. H. Schott
A. J. Birney
Inventor.
Friedrich Lehner
By Max Bergü
his attorney.

UNITED STATES PATENT OFFICE.

FRIEDRICH LEHNER, OF ZURICH, SWITZERLAND.

PROCESS OF MAKING ARTIFICIAL SILK.

SPECIFICATION forming part of Letters Patent No. 559,392, dated May 5, 1896.

Application filed April 16, 1895. Serial No. 545,930. (No specimens.) Patented in Germany September 16, 1890, No. 58,508; in Italy September 30, 1890, No. 27,943; in Austria-Hungary April 29, 1891, No. 54,062 and No. 9,475; in Switzerland June 22, 1891, No. 3,740, and in England July 11, 1891, No. 11,831.

*To all whom it may concern:*

Be it known that I, FRIEDRICH LEHNER, a citizen of Germany, residing at Zurich, Switzerland, have invented certain new and useful Improvements in Processes of Making Artificial Silk, (patented in Germany, No. 58,508, dated September 16, 1890; in Great Britain, No. 11,831, dated July 11, 1891; in Italy, No. 27,943, dated September 30, 1890; in Austria-Hugary, No. 54,062 and No. 9,475, dated April 29, 1891, and in Switzerland, No. 3,740, dated June 22, 1891;) and I do hereby declare the following to be a full, clear, and exact description of the invention, such as will enable others skilled in the art to which it appertains to make and use the same.

This invention relates to the art of manufacturing artificial silk, and its object is the production of a thread which has all the glossy appearance and other properties of natural silk and which is incombustible or difficult of combustion.

For this purpose my invention consists in the method and other features hereinafter set forth and covered in the claims.

In carrying out my invention I take silk-waste of all kinds, including the flaky waste products formed in the process of spinning floss-silk. These remnants and wastes are thoroughly cleansed and digested for twenty-four hours with a concentrated solution of caustic potash, caustic soda, or also a solution of copper or a copper salt in ammonia, (cupro-ammonium oxid or cuprammonia.) The silk substance is thereby dissolved. The silk solution thus obtained is filtered, diluted with water, and thereupon neutralized by an acid. The result of this neutralization is that the silk substance (a mixture of fibroin and sericin) is slowly precipitated or thrown out of the solution in the form of fine threads having a pale reddish color. The pure substance thus obtained is thoroughly washed with water, the water expressed by light pressure, and the said substance is then dissolved in concentrated acetic acid in the proportion of one to five. This solution I term "solution A."

The second solution, which I term "solution B," is obtained as follows: Cellulose, silk paper, cotton or spinning wastes are macerated for substantially a quarter of an hour with a solution of copper or a copper salt in ammonia, the solution is expressed, and the residue thoroughly washed with water and nitrated in the ordinary way. The nitrocellulose so obtained is now dissolved in a mixture of wood-spirit (methyl alcohol) or ether and ethyl sulfuric acid, $(C_2H_5.HSO_4,)$ said mixture being preferably in the proportion of three parts of the former to one part of the latter. While I have claimed the use of wood-spirit specifically, it is to be understood from the above description that I consider ether as an equivalent of the wood-spirit so far as its use in my process is concerned. The ethyl sulfuric acid used in this process may be obtained by mixing two parts of strong alcohol with one part sulfuric acid of 60° Baumé, and gradually heated to 100° centigrade. The nitrocellulose is dissolved in the mixture of wood-spirit or ether and ethyl sulfuric acid in the proportion of eight parts of the former to one hundred parts of the latter and maintained at a heat of 30° centigrade for about one hour. A denitration of the dissolved nitrocellulose takes place under these conditions, nitroethene being evolved and escaping. The two solutions A and B are united, preferably, in such a way that five parts of nitrocellulose are combined with one part silk substance, (silk fibroin.) From the mixture so obtained the thread of artificial silk is formed by simply allowing said mixture to pass through a fine opening into a congealing or solidifying bath, preferably oil of turpentine, petroleum, benzin, benzol, liquid hydrocarbons, and other liquids free from oxygen.

An apparatus for carrying out this process is illustrated in the accompanying drawing, which represents the same in sectional elevation.

In the drawing, *a* represents the tank for containing the mixture of the solutions A and B. *b* represents the vessel containing the congealing or solidifying liquid. A pipe *c*, provided with a suitable cock or other regulating device, communicates with the tank *a*, and is provided with an outlet or small orifice $d$ at or near the bottom of the vessel $b$, through which the liquid mixture from $a$ passes into the liquid contained in the vessel $b$, below the level of the said liquid. This orifice $d$ is located below the level of the liquid in the tank $a$, so that it will be forced into the congealing liquid under a certain head or pressure. The liquid from $a$, as it passes through the liquid in the vessel $b$, is congealed or solidified and formed into a thread $e$, which is drawn forth from the congealing-bath and spun and wound by suitable machinery. It is not necessary to go any further into the description of the apparatus for the method of forming the thread in this application, as the same has been claimed in my application, Serial No. 401,014, filed July 25, 1891, and forms no part of the present invention. The thread so formed is then preferably further treated under my invention to further denitrate the pyroxylin and to remove the oil of turpentine or petroleum adhering thereto. For this purpose the thread is heated with water to about 80° centigrade for about one hour. Under this action a further denitration of the pyroxylin takes place owing to the decomposition of the free ethyl sulfuric acid present in the thread. Thereupon the thread is thoroughly rinsed with water and laid into a solution containing about ten parts soluble glass for several days, whereby the sulfuric acid still adhering is neutralized, the silicic acid being hereby separated and filling up the pores of the thread, whereby the same is made still more incombustible; or the sulfuric acid may be neutralized by laying the thread for about twenty-four hours into a solution of ammonia of the specific gravity of 0.975 before washing the same with water. The thread is thereupon dried in the air.

What I claim, and desire to secure by Letters Patent, is—

1. The process which consists in mixing a solution of silk substance with a solution of nitrocellulose, and drawing forth the thread from such mixture.

2. The process which consists in mixing a solution of silk substance with a solution of nitrocellulose, and causing the said mixture to pass through a congealing bath or solution to form a thread.

3. The process which consists in mixing a solution of silk substance with a solution of nitrocellulose, and causing the said mixture to pass through a congealing bath or solution containing no oxygen, to form a thread.

4. The process which consists in mixing a solution of silk substance with a solution of nitrocellulose, and causing the said mixture to pass through a congealing bath or solution of a hydrocarbon or hydrocarbons, to form a thread.

5. The process which consists in digesting silk-waste with caustic alkali and a solution of copper or a copper salt in ammonia, then precipitating the silk substance from said solution and dissolving the said precipitate in concentrated acetic acid.

6. The process which consists in macerating cellulose, silk paper, cotton or other substance containing cellulose, with a solution of a copper salt in ammonia and then nitrating the same, and finally partially denitrating the resulting nitrocellulose.

7. The process which consists in macerating cellulose, silk paper, cotton or other substance containing cellulose with a solution of a copper salt in ammonia, then nitrating the same, and then dissolving the resulting nitrocellulose in a mixture of wood-spirits or ether and ethyl sulfuric acid to partially denitrate the same.

8. The process which consists of the following steps: first, preparing two solutions of, firstly, silk-waste digested with caustic alkali or a solution of copper or a copper salt in ammonia, precipitated from such solution and finally dissolved in concentrated acetic acid, secondly, a substance containing cellulose macerated with a solution of copper or a copper salt in ammonia and nitrated and then partially denitrated, mixing the two solutions thus formed, and drawing the thread forth from said solutions.

9. The process which consists of the following steps: first, preparing two solutions of, firstly, silk-waste digested with caustic alkali or a solution of copper or a copper salt in ammonia, precipitated from such solution and finally dissolved in concentrated acetic acid, secondly, a substance containing cellulose macerated with a solution of copper or a copper salt in ammonia and nitrated and then partially denitrated, mixing the two solutions thus formed, and causing the said mixture to pass through a congealing solution or bath whereby a thread is formed.

10. The process which consists in adding a solution of silk substance to a solution of partially-denitrated nitrocellulose, passing the thread through a solution containing oil of turpentine or other hydrocarbon, and rendering the thread incombustible by heating with water and rinsing.

11. The process which consists in treating a solution of cellulose with a solution of a copper salt in ammonia, then nitrating the same, then preparing ethyl sulfuric acid by dissolving two parts strong alcohol in one part sulfuric acid and gradually heating to 100° centigrade, then adding the ethyl sulfuric acid to wood-spirits, then dissolving the nitrocellulose in the bath so obtained to partially denitrate the same, then adding this solution of nitrocellulose to a solution of silk substance, then drawing forth the thread and finally rendering the thread incombustible by neutralizing the sulfuric acid still adhering to the same.

12. In a thread of artificial silk, the combination, of nitrocellulose with silk substance, substantially as set forth.

13. In a thread of artificial silk, the combination, of a silk substance, with partially-denitrated nitrocellulose, substantially as set forth.

14. A thread of artificial silk consisting of a silk substance, in combination with partially-denitrated cellulose and silicic acid, substantially as set forth.

In testimony whereof I affix my signature in presence of two witnesses.

FRIEDRICH LEHNER.

Witnesses:
H. LABHART,
EMILIE MAJORES.